April 2, 1929. T. H. THOMAS 1,707,288
FLUID PRESSURE BRAKE
Filed Jan. 28, 1927
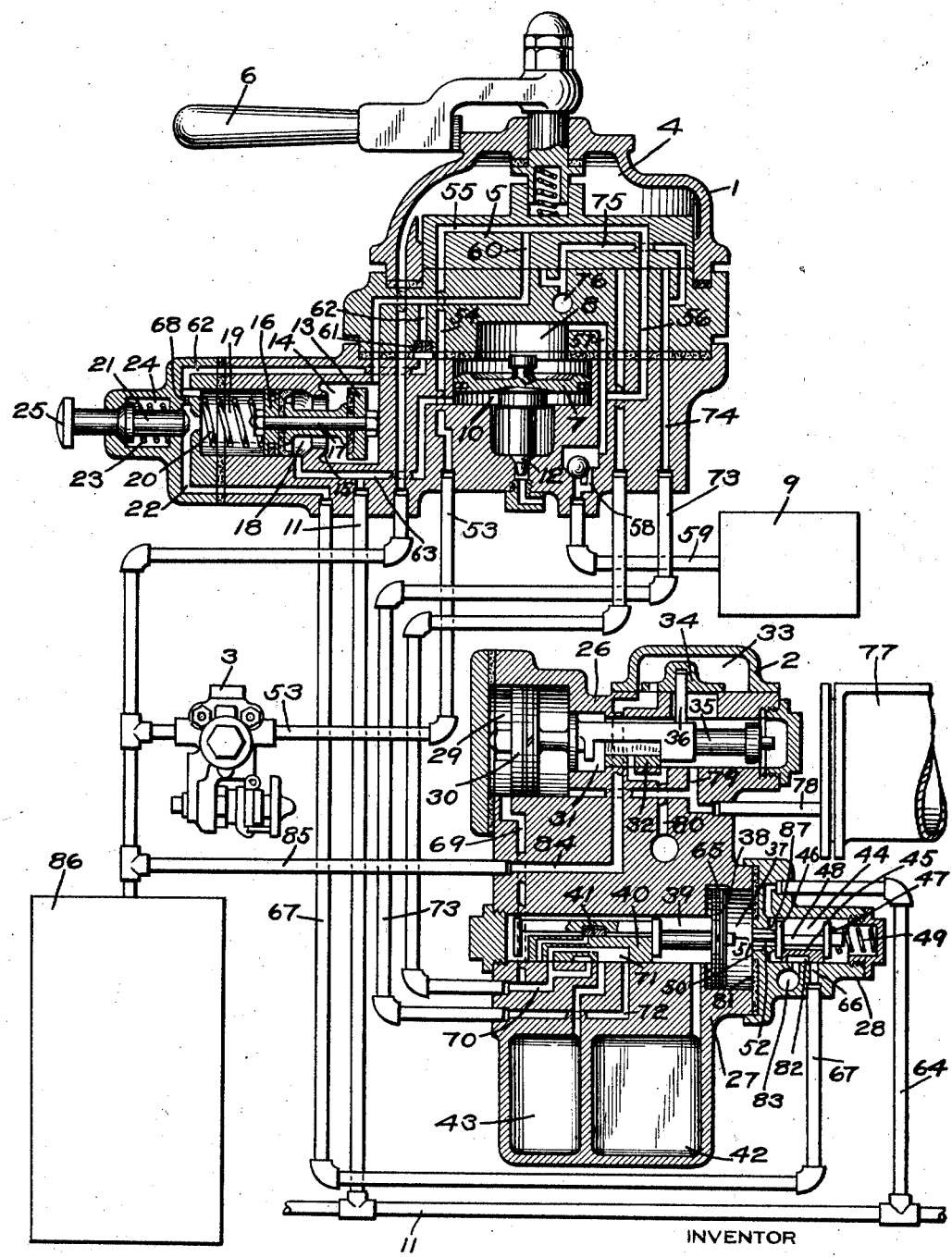
INVENTOR
THOMAS H. THOMAS
BY Wm. M. Cady
ATTORNEY Patented Apr. 2, 1929.

1,707,288

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed January 28, 1927. Serial No. 164,212.

This invention relates to fluid pressure brakes, and more particularly to the brake control equipment on the locomotive.

In the usual locomotive fluid pressure brake equipment the automatic brake valve device is normally carried in running position, while the brakes are held released, and in said position fluid under pressure is supplied to the brake pipe through a feed valve device, to maintain the pressure in the brake pipe at a predetermined degree.

When the brakes are in release position, if a sudden reduction in brake pipe pressure is initiated at a point in the train, other than by operation of the automatic brake valve device, said reduction will be propagated serially throughout the train by the well known quick serial action, and the brakes will be applied. If, under such a condition, the brake valve device is not moved from the running position to the lap position, so as to cut off the flow of fluid to the brake pipe, the brakes on the locomotive and on the cars at the head of the train are liable to be released, by the continued flow of fluid to the brake pipe.

Some types of brake equipment are not adapted to propagate quick serial action in emergency after a light service reduction in brake pipe pressure has been made, and if a sufficient number of cars equipped with such types of brake apparatus happen to be together, it may result in the failure to propagate quick serial action to the locomotive, even though other cars in the train may be provided with brake pipe vent valve devices, adapted to cause quick serial action after a service reduction in brake pipe pressure.

Under the above conditions, however, the operation of the vent valve devices in the train causes a brake pipe reduction in excess of a full service reduction before said devices close and cut off communication between the brake pipe and the atmosphere. The over reduction in brake pipe pressure caused by operation of the vent valve devices effects an application of the brakes, but the fluid under pressure supplied by the feed valve device, with the brake valve device in running position, tends to cause a release of the brakes on the head end of the train, the same as after an emergency application.

The principal object of my invention is to provide means for automatically cutting off the flow of fluid to the brake pipe at the brake valve device to ensure retaining an application of the brakes on a train, either after the occurrence of an undesired emergency application or an undesired over service reduction in brake pipe pressure, with the brake valve device in running position.

In the accompanying drawing, the single figure is a sectional view of a brake control equipment, embodying my invention.

The apparatus shown in the drawing includes a brake valve device 1, a distributing valve device 2, and the usual feed valve device 3.

The brake valve device 1 comprises a casing having a valve chamber 4, containing the usual rotary valve 5 adapted to be operated by a handle 6. Included in the casing is the usual equalizing discharge valve mechanism comprising a piston 7, having the chamber 8 at one side connected to the equalizing reservoir 9 and the chamber 10 at the opposite side connected to the brake pipe 11. Piston 7 is adapted to operate a discharge valve 12 for venting fluid from the brake pipe 11.

Also included in the brake valve casing is a cut off valve mechanism comprising a valve 13 contained in a chamber 14 and adapted, in one position, to seal against a seat ring 15. A piston 16 is connected to the valve 13 by a stem 17 and has at one side a chamber 18 connected to the brake pipe 11 and at the opposite side, a chamber 19 containing a coil spring 20 acting on said piston. There is also a double beat valve 21, adapted in one position to close communication between chamber 19 and passage 22 and in the opposite normal position, in which it is held by the pressure of spring 23, to close communication between spring chamber 24 and the atmosphere. Said double beat valve has an extended stem provided with a push button 25 on its outer end, by which the double beat valve 21 is manually operated.

The distributing valve device 2 comprises a casing having the usual application portion 26 and equalizing portion 27, and a valve device 28 for controlling the operation of the cut off valve mechanism in the brake valve device.

The distributing valve application portion comprises a casing having a piston chamber 29 containing an application piston 30, a valve chamber 31 containing an exhaust valve 32, and a valve chamber 33 containing an application valve 34; said valves being operated by the movement of the piston stem 35.

The equalizing portion 27 comprises a casing having a piston chamber 37 containing the equalizing piston 38 and a valve chamber 39 containing a main slide valve 40 and an auxiliary slide valve 41, adapted to be operated by said piston. Said casing also contains the usual pressure chamber 42 and application chamber 43.

The valve mechanism 28 may be included in the equalizing piston cylinder cover and comprises a valve chamber 44, containing a slide valve 45 adapted to be operated by a stem 48, said valve being mounted between collars 46 and 47 carried by said stem. A spring 49 acts on the collar 47 and normally maintains the slide valve in the position shown in the drawing. A fluted extension 52 of the stem 48, at the left side of the collar 46, extends through an opening in the cylinder cover wall 50 and is adapted to be engaged and operated by a stem 51 of the equalizing piston 38. The stem extension 52 is fluted, so that when collar 46 strikes the inner side of wall 50, communication between valve chamber 44 and piston chamber 37 is maintained by way of said flutes and passage 87 in the wall 50.

In operation, with the brake valve device in running position and the train brakes released, fluid at the reduced pressure supplied by the feed valve device 3, flows through pipe 53, passage 54 in the brake valve device, cavity 55 in the rotary valve 5 and thence through passages 56 and 57 to chamber 8 at one side of the equalizing piston 7, and from passage 57 through the choke 58 and pipe 59 to the equalizing reservoir 9. Fluid at feed valve pressure also flows from the cavity 55 in the rotary valve 5, through port 60 and thence into valve chamber 14, and also from passage 60 through passage 62, containing a choke plug 61, and into spring chamber 19, which is connected through passage 22, pipe 67 and passage 66 in the distributing valve device to the seat of the slide valve 45. In initially charging the brake system, the spring 49 acting on the collar 47 of the stem 48 holds the slide valve 45 in the position shown in the drawing, in which position passage 66 is lapped, thus preventing the escape of fluid supplied to spring chamber 19 by way of passage 22, so that opposing fluid pressures in spring chamber 19 and valve chamber 14 are balanced, permitting the pressure of spring 20 to shift and hold the piston 16 and valve 13 in the position shown in the drawing, in which position, fluid at feed valve pressure from chamber 14 flows to chamber 18 and thence through passage 63 to brake pipe 11, and to the equalizing piston chamber 10, charging said brake pipe and chamber. The pressures thus being equalized on opposite sides of the equalizing piston, the discharge valve 12 is held seated.

Fluid under pressure from the brake pipe 11 flows through the branch pipe 64 to valve chamber 44 of the distributing valve device and thence through the passage 87 and past the fluted stem 52 to piston chamber 37 of the equalizing portion, from which chamber said fluid is supplied through the feed groove 65, around the piston 38 when in release position, to valve chamber 39, which is in communication with the pressure chamber 42, charging said chamber with fluid at brake pipe pressure.

Normally, the pressure of spring 23 holds the double beat valve 21 in the position shown in the drawing, in which position, said valve is seated so as to prevent escape to the atmosphere of the fluid under pressure that leaks from passage 22 through the clearance around the double beat valve stem in the casing and into the spring chamber 24.

With the brake valve device in running position and the equalizing portion 27 of the distributing valve device in release position, the application cylinder 29 is vented to the atmosphere through passages 69 and 70, cavity 71 in the equalizing slide valve 40, passage 72, the usual release pipe 73, passage 74 in the brake valve device, cavity 75 in the rotary valve 5 and the atmospheric passage 76. When the application cylinder 29 is vented to the atmosphere, the application piston will be in the position shown in the drawing, in which the brake cylinder 77 is vented to the atmosphere through pipe 78, passage 79, valve chamber 31 and atmospheric passage 80.

When a sudden reduction in brake pipe pressure is initiated at some point in the train, said reduction is propagated serially throughout the train in the well known manner. When the wave of reduction in pressure reaches the locomotive, the pressure in the brake pipe 11, the branch pipe 64, and the valve chamber 44, and piston chamber 37 of the distributing valve device, is suddenly reduced, causing the equalizing piston 38 to move to emergency position, in which it strikes the gasket 81. Said movement causes the piston stem 51 to engage the fluted stem extension 52 and shift said stem and the slide valve 45 to a position in which the cavity 82 connects passage 66 to the atmospheric passage 83. Passage 66 being connected through pipe 67 with chamber 19, the fluid under pressure in said chamber is vented to the atmosphere at a faster rate than it can be supplied from the feed valve device through the choke plug 61, so that the feed valve pressure in chambers 14 and 18 shift the piston 16 and valve 13 against the pressure of spring 20, until valve 13 seals against the seat ring 15. In this position, communication between chamber 14, connected to the feed valve device, and chamber 18, connected to the brake pipe, is cut off, so that even though the brake valve device remains in running position, fluid at feed valve pressure cannot flow to the brake pipe.

Movement of the equalizing piston 38 to emergency position shifts the slide valves 40 and 41 to emergency position, in which fluid under pressure in valve chamber 39 and pressure chamber 42 flows past the end of the slide valve 40 into passage 70 and thence through passage 69 to the application cylinder 29, wherein said pressure operates to shift the application piston 30 and move the exhaust slide valve 32 so as to close communication between valve chamber 31 and atmospheric passage 80 and open communication between valve chamber 31 and valve chamber 33. Valve chamber 33 being connected by passage 84 and pipe 85 to the main reservoir 86, fluid under pressure from the main reservoir flows into valve chamber 31 and thence through passage 79 and pipe 78 to the brake cylinder 77, and applies the brakes. When the pressures on opposite sides of the application piston become equalized, said piston operates to shift the application valve 34 and close communication between valve chamber 33 and valve chamber 31.

If after a light service reduction in the brake pipe of a train equipped with mixed brake equipments, an emergency reduction, initiated in the train, fails to be fully propagated to the locomotive, in any event, a brake pipe reduction in excess of a full service reduction will occur, due to the venting action of the vent valve devices in the train brake pipe. Said brake pipe on the locomotive is sufficient to cause the equalizing piston 38 of the distributing valve device to operate the valve mechanism 28 with a consequent operation of the cut-off valve mechanism and the closing of communication between the valve chamber 14 and the brake pipe 11. Since the flow of fluid to the brake pipe is thus cut off, the brakes on the locomotive, as well as on the cars in a train, will be applied and will remain applied so long as the cut-off valve mechanism is in position for preventing the flow of fluid from the feed valve device to the brake pipe.

To release an application of the brakes, caused as described above, and with the brake valve device still in running position, the push button 25 is pushed in, so as to opuerate the double beat valve 21 and cause the seating of the inner valve, so as to close communication from spring chamber 19 to passage 22. Fluid from the feed valve device then flows into said chamber and builds up a pressure sufficient to permit the spring 20 to shift the piston 16 and valve 13 to their open position, as shown in the drawing, in which position fluid at feed valve pressure in chamber 14 again flows to the brake pipe to effect a release of the brakes.

When the brake pipe pressure is increased sufficiently to release the brakes, the equalizing piston 38 and slide valves 40 and 41 of the distributing valve device are shifted to release position, in which the brakes are released in the usual manner. The pressure of spring 49 then shifts the stem 48 and slide valve 45 to their normal position, as shown in the drawing, in which passage 66 is lapped. The flow of fluid through choke 68 in the brake valve device then builds up a pressure in passage 22 and pipe 67, after which the button 25 may be released and permitted to return to its normal position, as shown.

If the passage 22 and pipe 67 were not charged through the choke 68 prior to releasing the double beat valve 21, the sudden venting of the fluid under pressure from chamber 19 into said passage and pipe would cause operation of the cut-off valve to momentarily close the connection between the feed valve device and the brake pipe. The capacity of choke 68 must be sufficiently less than the capacity of the choke plug 61 in passage 62, however, to ensure a sufficient pressure built-up in spring chamber 19 to shift the piston 16 and valve 13 to their open position, since before the equalizing piston in the distributing valve device is shifted to release position, the flow of fluid through choke 68 is to the atmosphere.

The flow of fluid through passage 62 is restricted by the choke plug 61 so as to ensure operation of the cut-off valve piston 16 and valve 13 when the spring chamber 19 is connected to the atmosphere. If choke plug 61 was omitted, the flow of fluid into spring chamber 19 would tend to maintain the pressure therein against the flow to the atmosphere through pipe 67 and thus prevent operation of the cut-off valve mechanism.

Having now described my invention, what I claim as new and desire to secure by Letters Patent, is:—

1. In a fluid pressure brake, the combination with a brake pipe and a brake valve device having means for supplying fluid under pressure to the brake pipe, of means operated upon a reduction in brake pipe pressure in excess of the full service reduction for cutting off communication through which fluid under pressure is supplied from said brake valve device to the brake pipe.

2. In a fluid pressure brake, the combination with a brake pipe and a brake valve device having a position in which fluid under pressure is normally supplied to the brake pipe to maintain the pressure in the brake pipe at a predetermined degree, of means operated upon a reduction in brake pipe pressure in excess of a full service reduction for cutting off the supply of fluid through said brake valve device to the brake pipe.

3. In a fluid pressure brake, the combination with a brake pipe and a brake valve device having a position in which fluid under pressure is normally supplied to the brake pipe, of a valve device operated upon a reduction in brake pipe pressure for applying the brakes and means operated by said valve device for cutting off the supply of fluid through said brake valve device to the brake pipe.

4. In a fluid pressure brake, the combination with a brake pipe and a brake valve device having a piston in which fluid under pressure is normally supplied to the brake pipe, of a cut-off valve device for controlling communication through which fluid is supplied from said brake valve device to the brake pipe, an equalizing slide valve operated upon a reduction in brake pipe pressure for effecting an application of the brakes, and means controlled by said equalizing valve device for effecting the operation of said cut-off valve device to close communication through which fluid is supplied from said brake valve device to the brake pipe.

5. In a fluid pressure brake, the combination with a brake pipe and a brake valve device having a position in which fluid under pressure is normally supplied to the brake pipe, of a cut-off valve device for controlling communication through which fluid is supplied from said brake valve device to the brake pipe, an equalizing valve device operated upon a reduction in brake pipe pressure for effecting an application of the brakes, and a valve operated upon movement of said equalizing valve device to apply the brakes for effecting the operation of said cut-off valve device to close communication through which said brake valve device supplies fluid to the brake pipe.

6. In a fluid pressure brake, the combination with a brake pipe and a brake valve device having a position in which fluid under pressure is normally supplied to the brake pipe, of a valve for controlling communication through which said brake valve device supplies fluid to the brake pipe, a piston operated by a variation in fluid under pressure for operating said valve, means for varying the fluid under pressure on said piston, and a manually operable valve for cutting off communication through which fluid under pressure is varied on said piston.

7. In a fluid pressure brake, the combination with a brake pipe and a brake valve device having a position in which fluid under pressure is normally supplied to the brake pipe, of a valve for controlling communication through which said brake valve device supplies fluid to the brake pipe, a piston operated upon a reduction in fluid pressure for operating said valve to close said communication, means operated upon a reduction in brake pipe pressure for venting fluid from said piston, and a manually controlled valve for cutting off communication through which fluid under pressure is vented from said piston.

In testimony whereof I have hereunto set my hand.

THOMAS H. THOMAS.